US012128541B2

(12) United States Patent
Hurley

(10) Patent No.: US 12,128,541 B2
(45) Date of Patent: Oct. 29, 2024

(54) MODULAR VERTICAL TOOL HANGER

(71) Applicant: Jonathan Hurley, Columbia Falls, MT (US)

(72) Inventor: Jonathan Hurley, Columbia Falls, MT (US)

( * ) Notice: Subject to any disclaimer, the term of this patent is extended or adjusted under 35 U.S.C. 154(b) by 0 days.

(21) Appl. No.: 18/186,852

(22) Filed: Mar. 20, 2023

(65) Prior Publication Data

US 2024/0316751 A1 Sep. 26, 2024

(51) Int. Cl.
*B25H 3/04* (2006.01)

(52) U.S. Cl.
CPC ............... *B25H 3/04* (2013.01); *Y10S 211/01* (2013.01)

(58) Field of Classification Search
CPC . B25H 3/04; Y10S 211/01; A47F 5/08; A47F 7/0028
USPC ....... 211/70.6, DIG. 1, 66, 89.01; 248/311.2, 248/683, 206.5, 309.4; 206/373, 376
See application file for complete search history.

(56) References Cited

U.S. PATENT DOCUMENTS 4,114,241 A * 9/1978 Bisping ..................... F16L 3/13 248/68.1
4,410,095 A * 10/1983 Dembicks ................. A47F 5/08 248/225.11
5,645,177 A * 7/1997 Lin .......................... B25H 3/04 211/69.5
5,660,276 A * 8/1997 Winnard ................ B25H 3/028 211/DIG. 1
5,669,516 A * 9/1997 Horn ........................ B25H 3/06 211/DIG. 1
5,695,165 A * 12/1997 Moriarty ................... B01L 9/54 248/206.5
5,746,329 A * 5/1998 Rondeau ................. E04H 15/64 211/DIG. 1
5,788,303 A * 8/1998 Chia-Hsiang .......... B25H 3/003 294/143
5,806,822 A * 9/1998 Schulz .................... A61M 1/76 248/223.41
5,855,285 A * 1/1999 Laird ..................... B25H 3/003 206/378
5,979,675 A * 11/1999 Moriarty ................... B01L 9/54 248/231.71
6,047,827 A * 4/2000 Huang ................... B25H 3/003 206/349
6,364,135 B1 * 4/2002 Sirois ...................... F41A 23/18 211/64
6,571,966 B1 * 6/2003 Hsiao .................... A47F 7/0028 206/379
6,719,155 B1 * 4/2004 Chang ...................... B25H 3/04 211/DIG. 1
(Continued)

*Primary Examiner* — Jennifer E. Novosad
(74) *Attorney, Agent, or Firm* — Christensen O'Connor Johnson Kindness PLLC

(57) ABSTRACT

A tool hanger system (100) includes modular holder units (102) each composed in basic form of a magnetic base unit (104) configured with a back side to securely attach to an upright or vertical ferromagnetic surface. The holder units (102) also include selected tool adapters (106) that project from the front sides of the base units (104) to receive and hold a specific type and size of a mechanic's tool. The holder units (102) are configured to be connectable together in side-by-side relationship to each other to form the hanger system (100) of a desired length or capacity.

17 Claims, 10 Drawing Sheets

(56) References Cited

U.S. PATENT DOCUMENTS 6,811,127 B1 * 11/2004 Shiao ........................ B25H 3/04 211/DIG. 1
6,932,223 B1 * 8/2005 Lee ........................ B25H 3/04 206/349
7,014,158 B2 * 3/2006 Berry ........................ B25H 3/04 248/314
7,185,770 B1 * 3/2007 Roten ........................ A47B 81/00 211/70.6
7,300,031 B2 * 11/2007 Bertsch .............. A47G 23/0225 248/223.41
7,441,669 B1 * 10/2008 Dalbey .................. A63B 60/60 211/85.7
7,802,680 B2 * 9/2010 Krebs ........................ B25H 3/04 206/349
8,403,278 B1 * 3/2013 Kasbohm ................ F41A 23/18 42/99
9,205,553 B2 * 12/2015 Ou ........................ B25H 3/04
10,151,406 B2 * 12/2018 Netke ...................... B60R 16/08
10,843,328 B2 * 11/2020 Wacker ...................... F16B 1/00
11,103,989 B2 * 8/2021 Hurley .................. H01F 7/0252
11,110,589 B2 * 9/2021 Hurley .................. B25H 3/022
11,707,832 B2 * 7/2023 Hurley ..................... B25H 3/06 206/373
2002/0070185 A1 * 6/2002 Chen ........................ B25H 3/04 211/70.6
2005/0139741 A1 * 6/2005 Yuen ...................... A45C 11/20 248/311.2
2007/0272819 A1 * 11/2007 Wang ................. A47G 25/0607 248/476
2008/0115401 A1 * 5/2008 Roemer ................. A01K 97/10 211/70.6
2010/0258515 A1 * 10/2010 Chen ........................ B25H 3/04 211/70.6
2011/0114580 A1 * 5/2011 Chen ........................ B25H 3/04 211/70.6
2011/0303808 A1 * 12/2011 Bileth ................ A47G 23/0266 248/311.2
2013/0092808 A1 * 4/2013 Adachi .............. A47G 23/0216 248/311.2
2022/0347833 A1 * 11/2022 Hurley .................... A47J 45/02

* cited by examiner

MODULAR VERTICAL TOOL HANGER

BACKGROUND

A typical hanger system for holding tools, knives, and other kitchen utensils on a vertical wall or other upright surface is constructed of a fixed length, having a backing bar or bracket that is designed for attachment to the wall or other surface. In this regard, typically holes extend through the ends of the backing bar/bracket to receive screws therethrough. The tool hanger is of fixed length, and thus may not always fit at the location where it is desirable to mount the hanger. Also, it is typically necessary to physically mount the backing bar/bracket on a wall or surface, even if the surface is ferromagnetic, because the strip hanger is not able to be magnetically attached to the ferromagnetic surface. The present disclosure seeks to address the drawbacks of existing vertical tool hanger.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a tool hanger system is provided that is composed of modular, connectable holder units to receive and hold a desired number and types of mechanic's tools on an upright surface. The tool hanger system includes a magnetic base unit having a front side, a back side that is attachable to an upright ferrometallic surface and opposite side edges, at least one projection extending from one of the side edges and at least one socket extending into the second side edge to receive the at least one projection of an adjacent magnetic base unit to interlock the base units in side-by-side relationship, and a selected tool adaptor engageable with the base unit to project from the front side of the base unit, the adaptor configured to receive and hold a mechanic's tool.

In any of the embodiments described herein, wherein the at least one projection comprises a tenon and the at least on socket comprising a mortice.

In any of the embodiments described herein, wherein the at least one projection comprises a pin and the at least on socket comprising a dovetail.

In any of the embodiments described herein, wherein the at least one projection comprises a tongue and the at least on socket comprising a groove.

In any of the embodiments described herein, wherein the holder unit comprising at least one metallic plate positioned in the base unit between the front side and the backside of the base unit, and at least one magnet contacting the metallic plate toward the backside of the base unit, whereby the metallic plate enhancing the magnetic attraction of the base unit to the upright ferromagnetic surface.

In any of the embodiments described herein, wherein the at least on metallic plate is substantially planar in form.

In any of the embodiments described herein, wherein the area of the metallic plate is larger than the area of the at least one magnet In any of the embodiments described herein, further comprising a retainer to surround the at least one magnet to assist in retaining the at least one magnet in stationary position.

In any of the embodiments described herein, wherein the base unit comprising a back wall coinciding with the back side of the base unit, and the at least one magnet extending through the back wall.

In any of the embodiments described herein, wherein the tool adapter defining an opening extending therethrough configured for receiving a specific mechanic's tool therethrough in upright orientation.

In any of the embodiments described herein, wherein the tool adapter comprising at least one male projection extending therefrom for engaging in locking relationship with the base unit.

In any of the embodiments described herein, wherein the base unit comprising portions defining a socket for receiving the at least one male projection in locking relationship to receive and hold a specific type of mechanic's tool.

In any of the embodiments described herein, wherein the tool adaptor comprising an upper unit and a lower unit, both engageable with the base unit to project from the front side of the base unit in spaced vertical relationship to receive and hold a mechanic's tool that spans between the upper and lower units.

In any of the embodiments described herein, wherein the upper and lower units each comprising at least one male projection extending therefrom for engaging in locking relationship with the base unit.

In any of the embodiments described herein, wherein the base unit comprising portions defining a least one pair of spaced apart projecting arms for supporting the tool adaptor therebetween.

In any of the embodiments described herein, wherein the base unit comprising portions defining a first pair of spaced apart projecting arms and a second pair of spaced apart projecting arms for supporting the tool adapter.

In any of the embodiments described herein, wherein a first tool adaptor is supported by the first pair of projecting arms and a second tool adaptor is supported by the second pair of projecting arms.

In any of the embodiments described herein, wherein the first and second pair of spaced apart projecting arms are in vertically spaced apart relationship to each other.

In any of the embodiments described herein, wherein the spaced apart arms defining a support ledge extending along the lengths of the arms to underlie and support portions of the tool adaptor.

In any of the embodiments described herein, wherein the tool adaptor comprising detents projecting from the tool adapter and the projecting arms comprising portions defining cavities for closely receiving the detents to lock the tool adaptor into engagement with the projecting arms.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
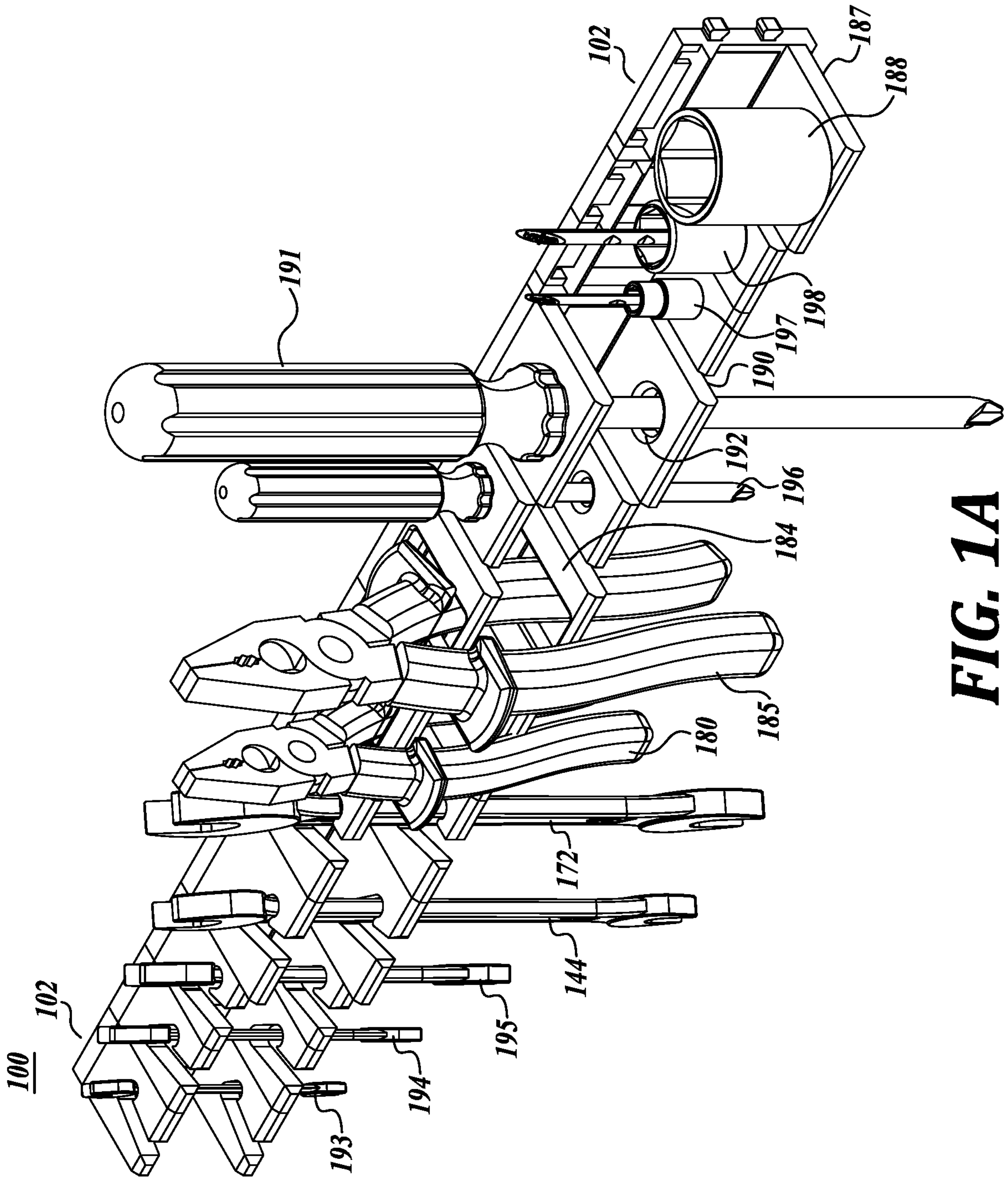
FIG. 1A is an embodiment of an isometric view of a modular vertical tool holder according to the present disclosure shown holding various types and sizes of mechanic's tools.
Figure 1D:
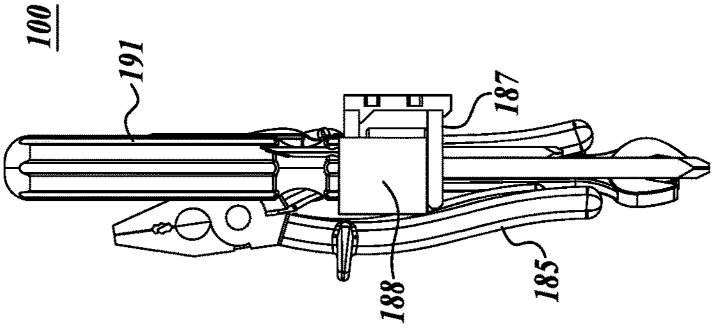
FIG. 1D is an end view of FIG. 1A.

Various example embodiments of the present disclosure are described below with reference to the accompanying drawings in which some example embodiments are illustrated. In the figures, the thicknesses of lines, layers and/or regions may be exaggerated for clarity.

While example embodiments are capable of various modifications and alternative forms, embodiments thereof are shown by way of example in the figures and are described in detail below. It should be understood, however, that there is no intent to limit example embodiments to the particular forms disclosed, but on the contrary, example embodiments are to cover all modifications, equivalents, and alternatives falling within the scope of the disclosure.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises." "comprising." "includes" and/or "including." when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," left hand," "in," "out," "extended," "advanced," "retracted," "proximal," "distal," "central," "vertical," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

In the present application, the term "ferromagnetic material" refers to a material that is strongly attracted by a magnet, or magnetic field, such as iron, steel, nickel, cobalt, etc. Also the term "magnetic hanger units" may be referred to as "magnetic units," "hanger units," "magnetic holder units," or "holder units." These terms are to be considered to be synonymous.

Further, the term mechanic's tools may include all manner of tools used by mechanics, including, but not limited to, wrenches, pliers, screw drivers, socket, socket wrenches, hex wrenches, etc.

In addition, the term kitchen utensil(s) may include, for example, knives, spoons, forks, ladles, scoopers, spatulas, scissors, mallets, crackers, presses, tongs, peelers, graters, whisks, can openers, mashers, basters, slicers, measuring cups, brushes slicers, etc.

In the following description, various embodiments of the present disclosure are described. In the following description and in the accompanying drawings, the corresponding systems assemblies, apparatus, and units may be identified by the same part number, but with an alpha suffix or by a prime ("'") or double prime ("''") or even a triple prime ("'''") designation. The descriptions of the parts/components of such systems assemblies, apparatus, and units that are the same or similar are not repeated so as to avoid redundancy in the present application.

Referring initially to FIGS. 1A-5E, a tool hanger system 100 in basic for includes modular holder units 102, each composed in basic form of a magnetic base unit 104 configured with a back side to securely attach to an upright or vertical ferro magnetic surface. The holder units 102 also include selected tool adapters 106 that project from the front sides of the base units 104 to receive and hold a specific type and size of a mechanic's tool. The holder units 102 are configured to be connectable together in side-by-side relationship to each other, as shown on FIGS. 1A-1C, to form the hanger system 100 of a desired length or capacity.

Figure 2:
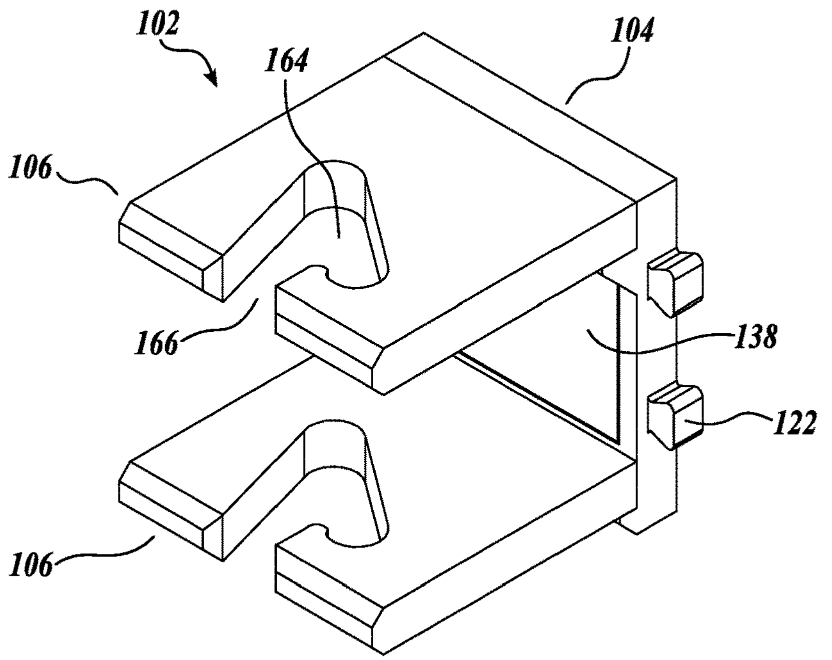
FIG. 2 is an isometric view of a singular tool holder unit shown in FIG. 1A.
Figure 3:
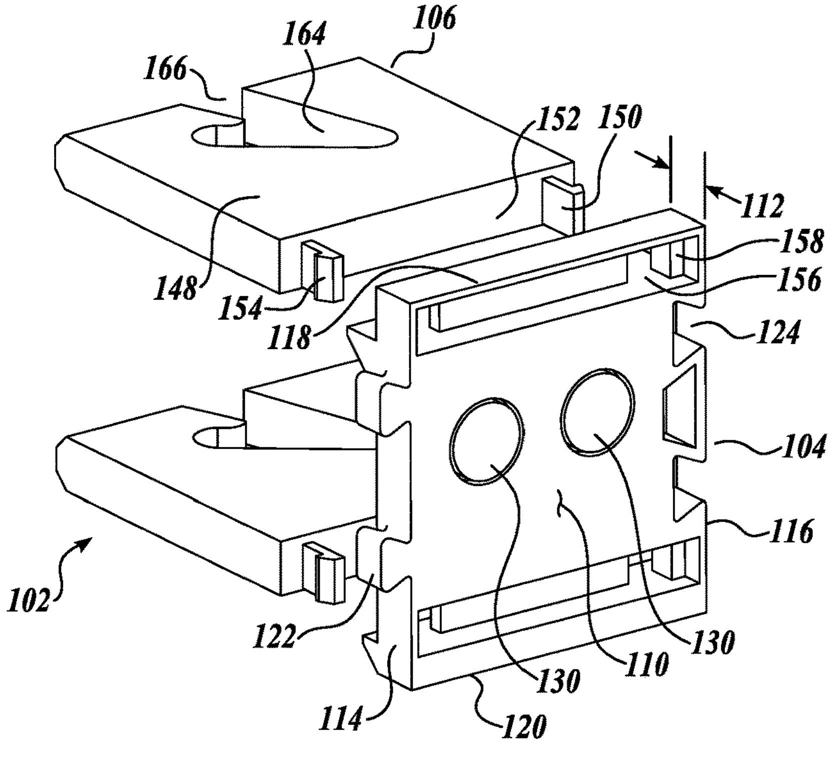
FIG. 3 is a partially exploded rear view of FIG. 2.
Figure 4:
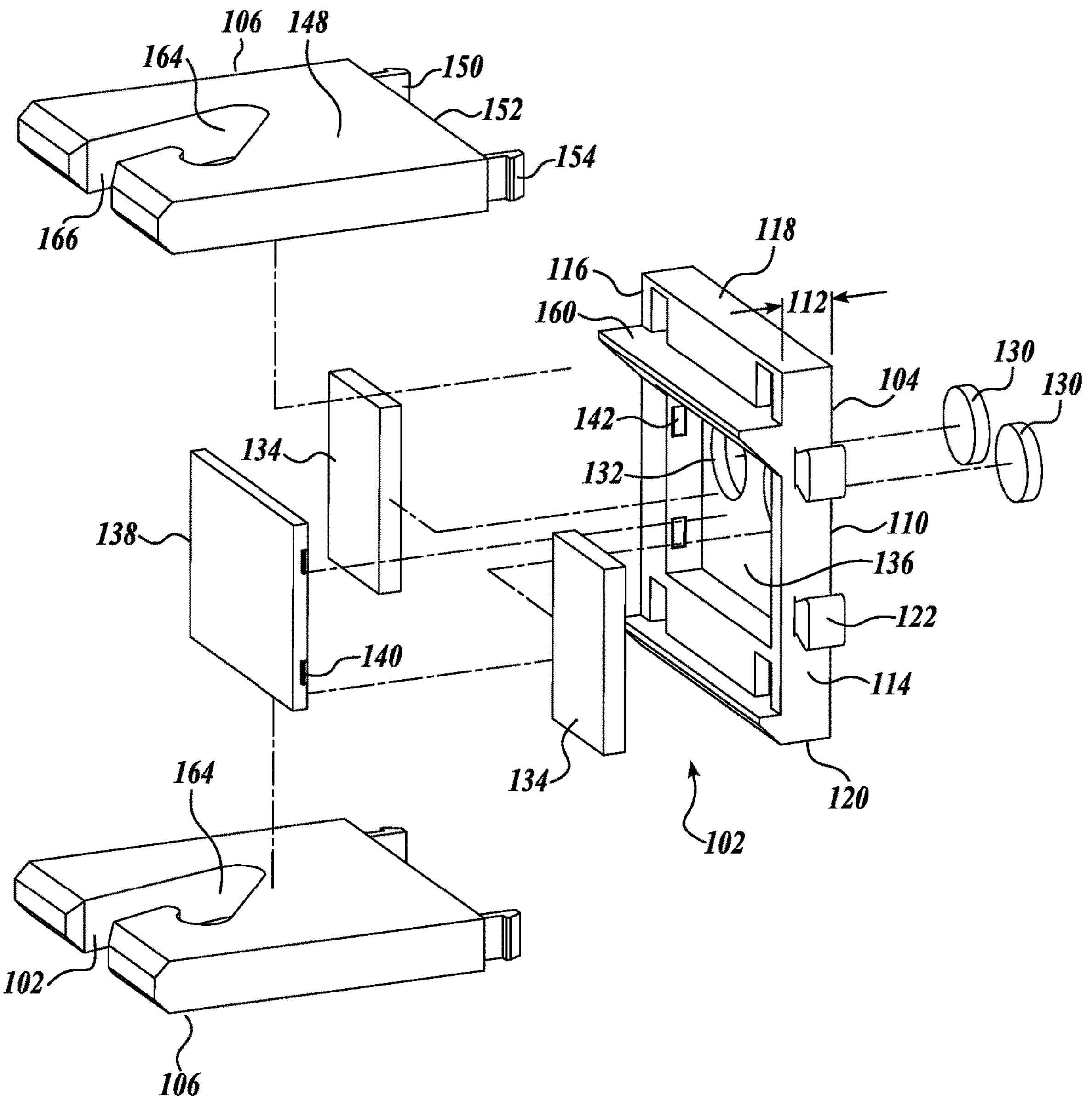
FIG. 4 is a front exploded view of FIG. 2.

Next describing the tool hanger system 100 in further detail, referring in particular to FIGS. 2-4, the magnetic base units 104 of the holder units 102 are generally planar in configuration to define a planar back wall 110 that serves as the interface between the holder unit and an upright/vertical mounting wall. The base unit has a thickness 112 that define side edges 114 and 116 as well as top and bottom edges 118 and 120.

A pair of vertically spaced apart projections 122 extend laterally from the side edge 114 that are shaped and sized to lockingly engage within sockets 124 formed in the side edge 116 of an adjacent base unit 104. Although the projections 122 are shown as being in the shape of a pin and the sockets 124 are shown as being in the form a dovetails, the projections can take other shapes, for example, the shape of a tenon or a tongue. Correspondingly, the sockets can be in the shape of a mortice or groove.

Regardless of the specific shapes of the projections 122 and sockets 124, what is desirable is that the projections securely lockingly engage the corresponding socket. In this regard, rather than using projections and sockets, other structures can be used to connect the base units 104 or modular holder units 102 together in side-by-side relationship.

Also, although two vertically spaced apart projections 122 and sockets 124 are shown associated with a base unit 104, it is possible that a singular projection and socket be employed. It is also possible that more than two projections 122 and sockets 124 be employed.

As noted above, the base units 104 are designed to be magnetically attracted to a ferrometallic surface, whether a vertical or sloped wall or surface. In this regard, two disc-shaped magnets 130 are shown as engaged within close fitting through holes 132 formed in the base unit back wall 110 so that the rearward surface of the magnets 130 are substantially coplanar with the back wall.

Although the magnets 130 are shown as being of a disc shape, they can be of other shapes, such as square, rectangular, hexagonal, octagonal, etc. Also, although two magnets are shown, a singular magnet could be used or more than two magnets could be employed.

A pair of rectangular metallic plates 134 are disposed in a close fitting shallow cavity 136 formed in the base unit 104. The plates 134 are secured in face-to-face relationship with the magnets 130, thereby to create a magnetic "sandwich." In this regard, the magnets 130 are sandwiched between the magnetic plates 134 and the metallic surface or wall on which the hanger system 100 is mounted. This assembly creates a magnetic field that can be many times stronger than the strength of the magnetic field created by the magnets 130 alone. Although two metallic plates 134 are illustrated, a singular plate could be used.

As shown in FIG. 4, a cover or retention plate 138 overlies the metallic plates 134 thereby to close off and seal the cavity 136. The cover 138 can be secured in place by numerous means, for example by the use of an adhesive or thermal welding. As another alternative, detents 140 can be provided to project a short distance from the side edges of the cover 138 to engage within close fitting blind holes 142 formed in the interior of the side edge portions 114 and 115 of the base unit 104. In this regard, the cover can be designed to snap in place into the cavity 136 to thereby formed a sealed construction.

Figure 5C:
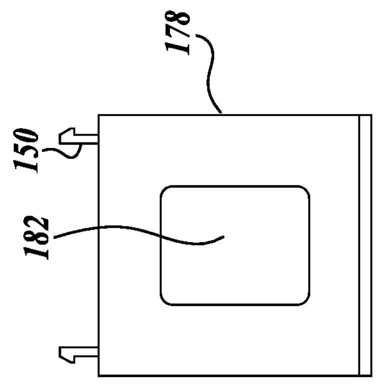
FIGS. 5A-5F are top plan views of the tool adaptor portions of the tool holder of FIG. 1A showing different configurations of the adaptor portion designed to hold different types of mechanic's tools.
Figure 5F:
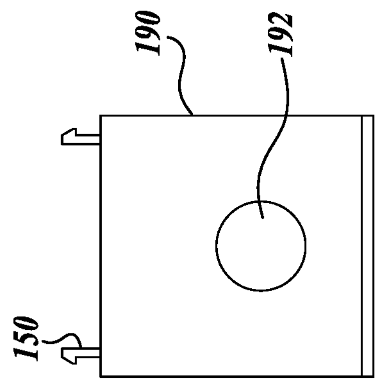

FIGS. 2, 3, and 4 show two vertically spaced apart tool adaptors 106 that are configured to receive and hold a wrench, such as the open-end wrench 144 shown in 1A-1C. A top view of this tool adaptor is shown in FIG. 5A. Other adaptors, discussed below, are shown in FIGS. 5B-5F. These other adaptors are of very similar construction to adaptor 106, with the exception of that the adaptors have openings, through holes or other features specific to the particular type and size of tool to be held or retained.

Each of the adaptors of FIGS. 5A-5F is generally in the form of a plate 148 that projects forwardly in spaced parallel relationship from the upper and lower portions of a base unit 104. Each adaptor 106 is constructed with two male projections or prongs 150 extending rearwardly for the back edge portion 152 of the adaptor plate 148. A hook or head 154 extend laterally from the distal ends of the prongs. The prongs 150 extend into a close fitting openings 156 formed in the base unit 104 until the hook or head 152 extend beyond the openings to bear against vertical shoulders 158 and the end of the opening. The prongs 150 are positioned on the adaptor plate 148 so that the prongs much deflect laterally towards each other due the hooks 154 bearing against the sides of the openings 156 until the hooks extend beyond the openings to allow the prongs to spring back to their nominal position. In this manner the adaptors 106 are in locking engagement with the base unit 104.

As most clearly shown in FIGS. 3 and 4, a supporting ledge 160 extends horizontally from the front side of the base unit 104 to underline and support the adjacent portion of the adaptor plate 148. From the distal edge of the ledge, the ledge extends diagonally downwardly back to the base unit 104.

As note above the adaptor 106 is configured to receive and support a mechanic's wrench 144. See FIGS. 1A, 1B, 2, 3, 4 and 5A. In this regard, the diagonal slot 164 is formed through the adaptor plate 148. A lead in slot 166 is provided to conveniently place the wrench 144 into and out of engagement with the slot 164

Figure 5B:
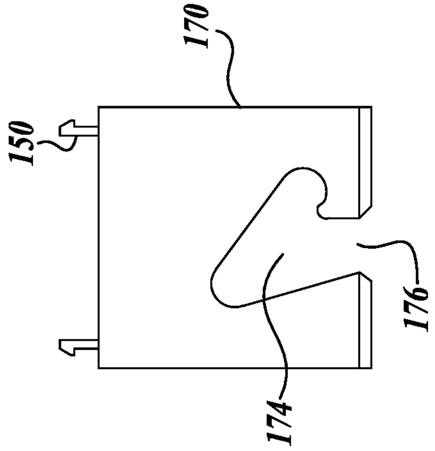

The tool adaptor 170 shown in FIG. 5B is similar to the tool adaptor 106, but configured to hold a large size wrench 172. In this regard, the adaptor 170 is configured with a diagonal slot 174 and a lead in slot 176.

The tool adaptor 178 shown in FIG. 5C is configured to receive one handle of a pair of pliers 180. In this regard, a rectangular through hole 182 is formed in the adaptor 178.

Figure 5E:
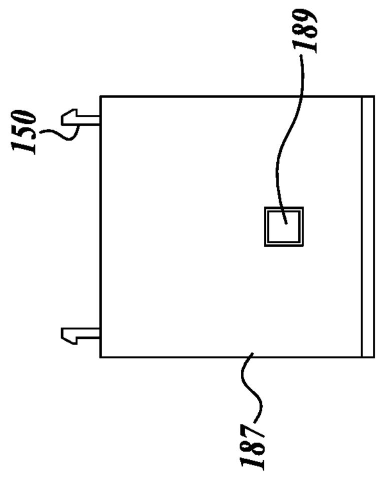
Figure 5A:
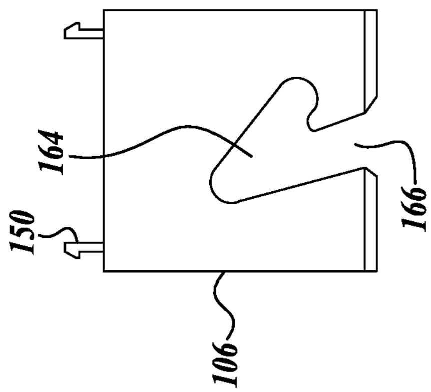
Figure 5D:
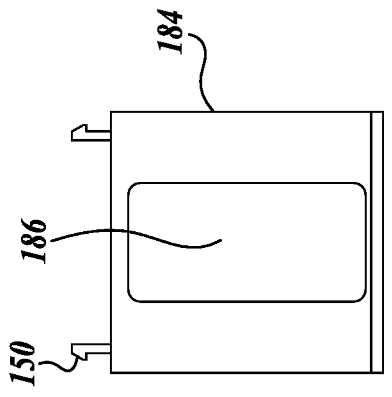
Figure 6A:
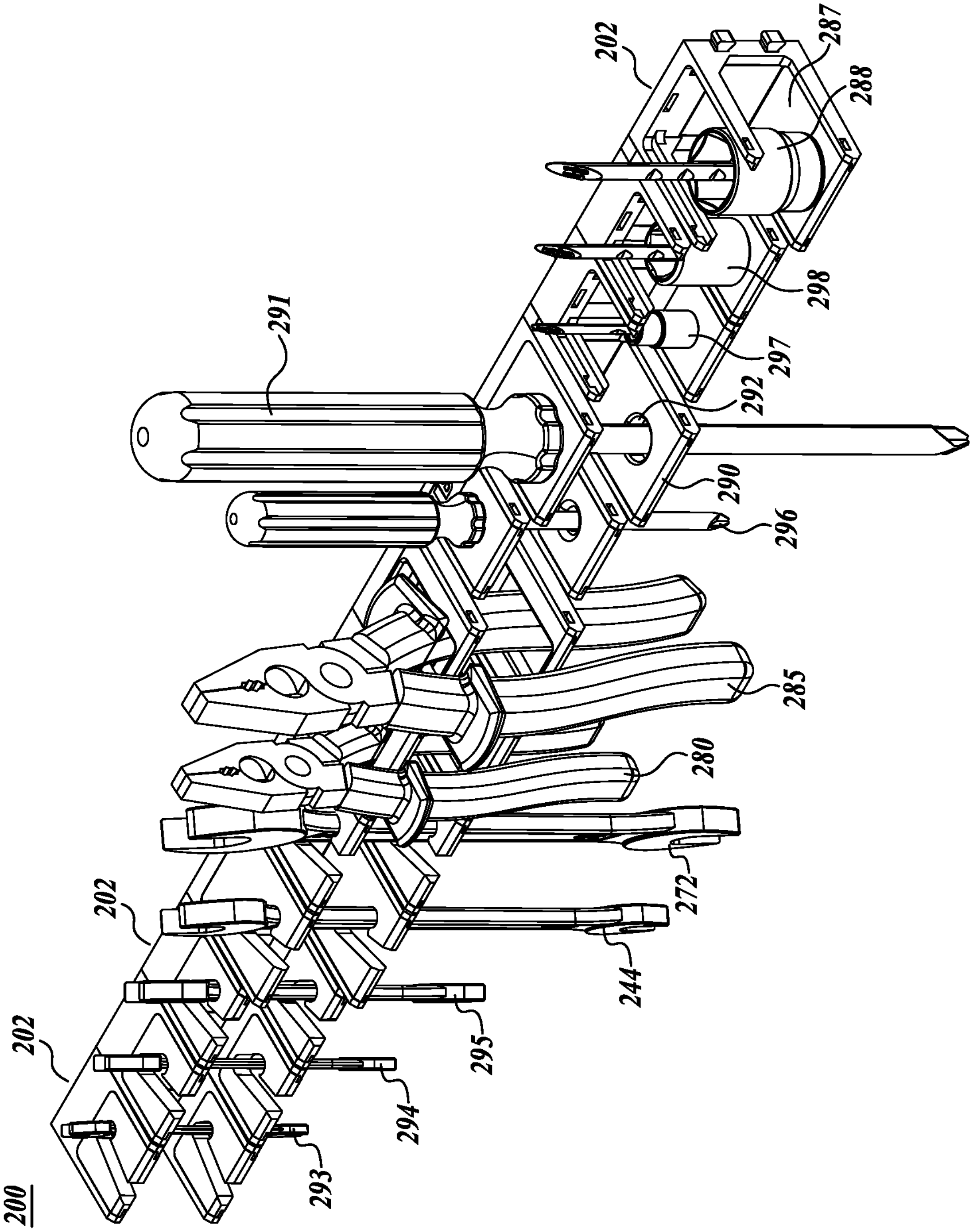
FIG. 6A is another embodiment of an isometric view of a modular vertical tool holder according to the present disclosure shown holding various types and sizes of mechanic's tools.
Figure 6D:
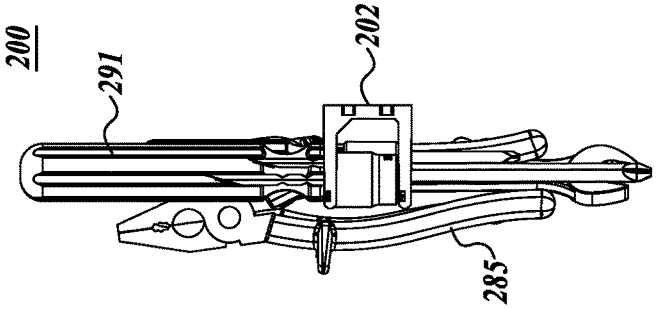
FIG. 6D is an end view of FIG. 6A.
Figure 6B:
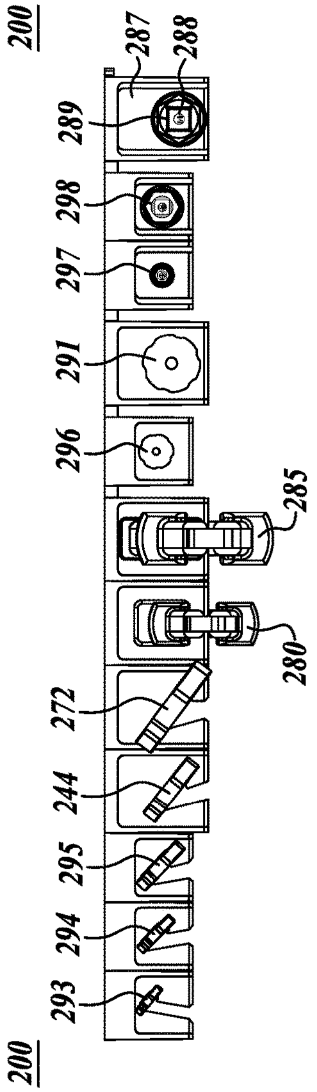
FIG. 6B is a top or plan view of FIG. 6A.
Figure 6C:
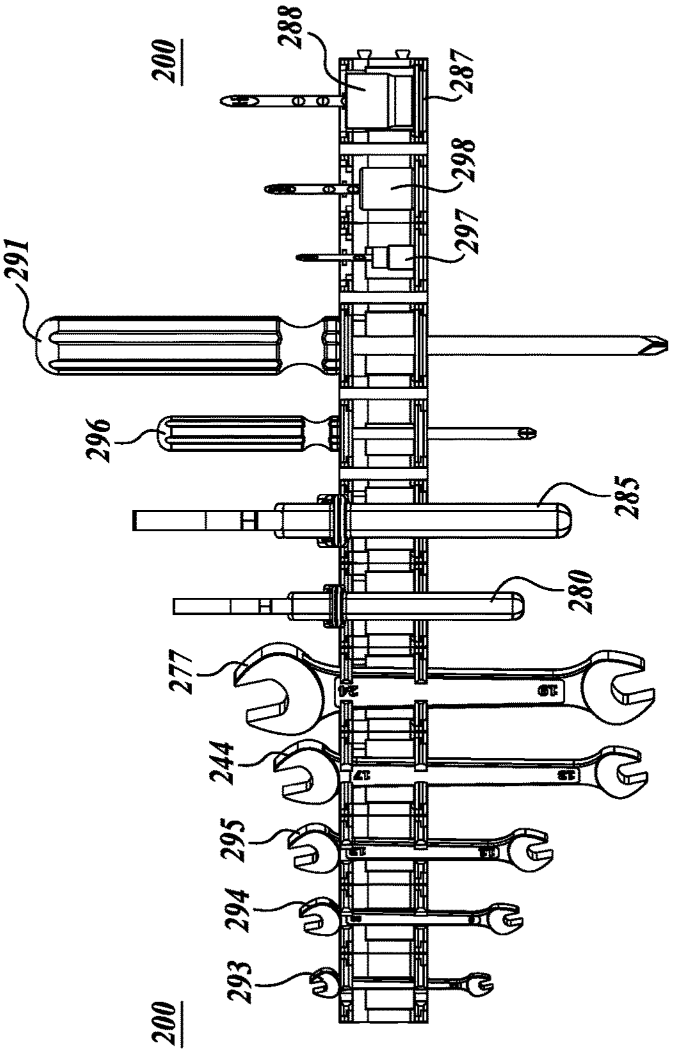
FIG. 6C is a front elevational view of FIG. 6A.

The tool adaptor 184 shown in FIG. 5D is configured to receive a larger pair of pliers 185. As such, the through hole 186 formed in the adaptor 184 is larger than the through hole 182.

The adaptor 187 shown in FIG. 5E is configured to hold a socket 188. In this regard, a square shank 189 extends upwardly from the top surface of the adaptor 187 to engage the drive hole at the end of the socket. As shown in FIGS. 1A-1D, to provide clearance for socket 188, an upper adapter is not used, rather the square shank 189 is mounter on a single lower adapter 187.

The adaptor 190 shown in FIG. 5F is configured to hold a screwdriver 191. In this regard, a circular hole 192 extends through the adaptor 190 to receive the shank of the screwdriver 191 downwardly therein.

Figure 1B:
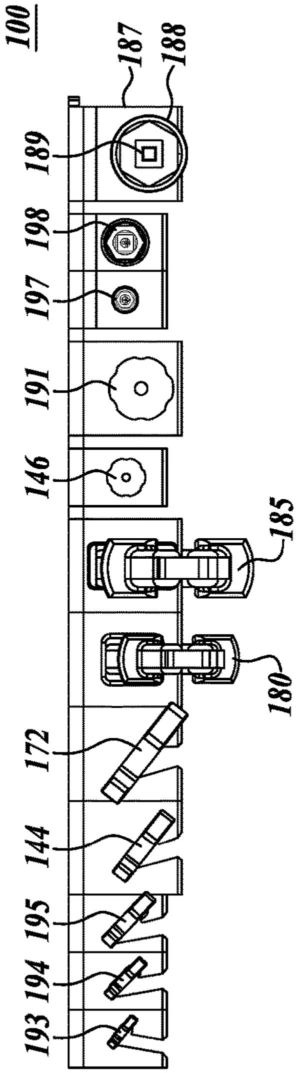
FIG. 1B is a top or plan view of FIG. 1A.
Figure 1C:
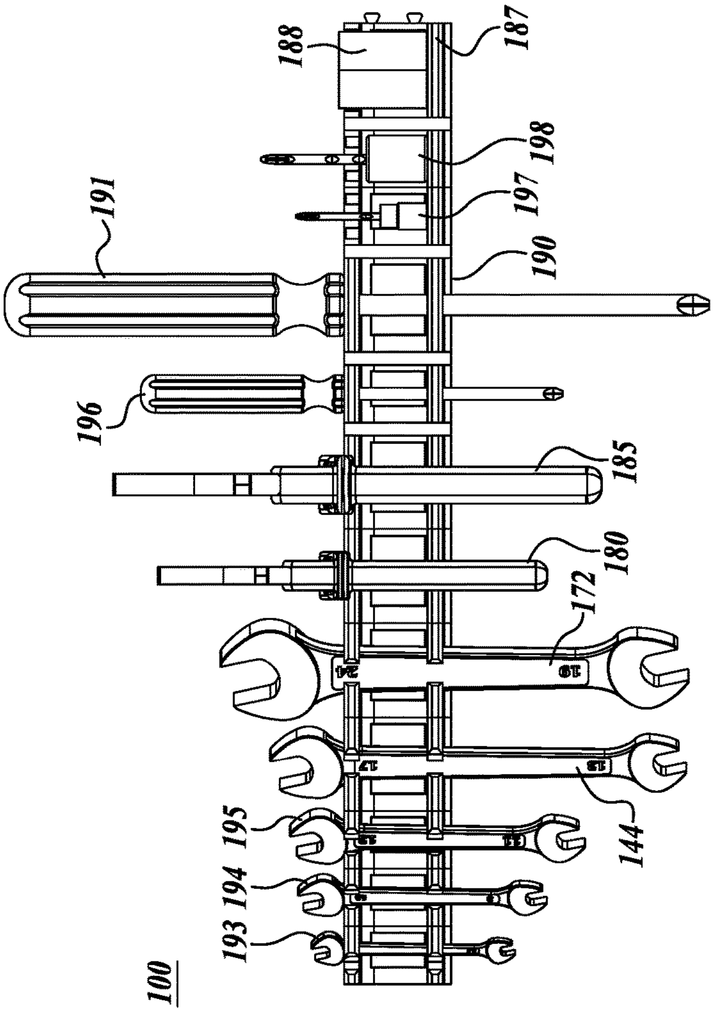
FIG. 1C is a front elevational view of FIG. 1A.

FIGS. 1A-1C show adaptors configured to hold additional tools including wrenches 193, 194 and 195, and smaller screwdriver 196 and sockets 197 and 198. Of course, the adaptors can be configured to hold numerous other types of mechanic's tools, such as punches, snippers, rachet wrenches, crescent wrenches, hammers, mallets, etc. Further, as with socket 188, for sockets 197 and 198 a single lower adapter is used so as to provide clearance for the sockets.

FIGS. 6A-D, 7, 8, 9, and 10A-10F disclose a tool hanger system 200 constituting a further embodiment of the present disclose. The parts/items that are the same or similar to those shown in FIGS. 1-5F are indicated with a 200 series part number.

Referring initially to FIGS. 6A-10E, the tool hanger system 200 in basic form includes modular holder units 202, each composed in basic form of a magnetic base unit 204 configured with a back side to securely attach to an upright or vertical ferromagnetic surface. The holder units 202 also include selected tool adapters 206 that project from the front sides of the base units 204 to receive and hold a specific type and size of a mechanic's tool. The holder units 202 are configured to be connectable together in side-by-side relationship to each other, as shown on FIGS. 6A-6C to form the hanger system 200 of a desired length or capacity.

Figure 7:
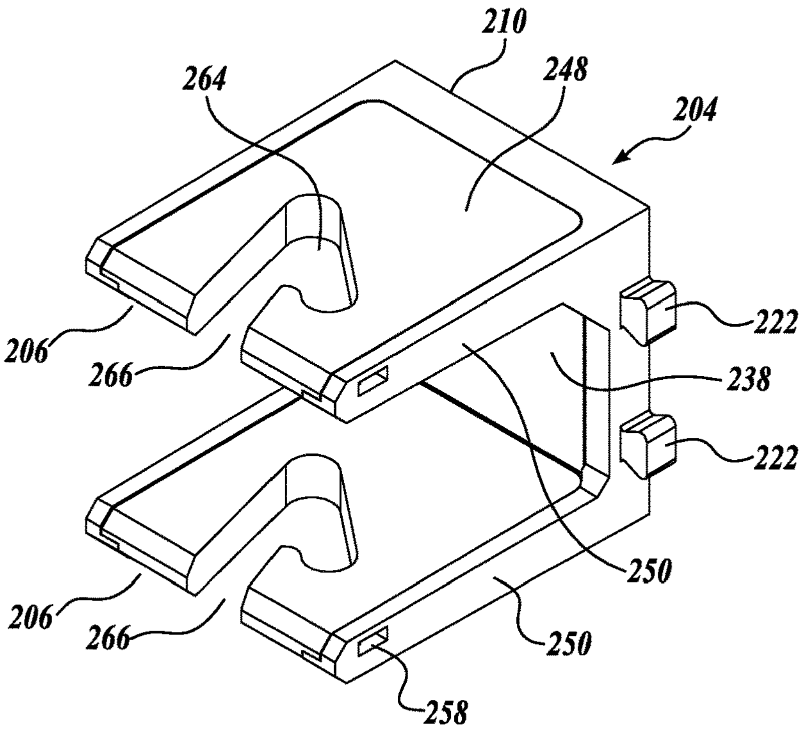
FIG. 7 is an isometric view a singular tool holder unit shown in FIG. 6A.
Figure 8:
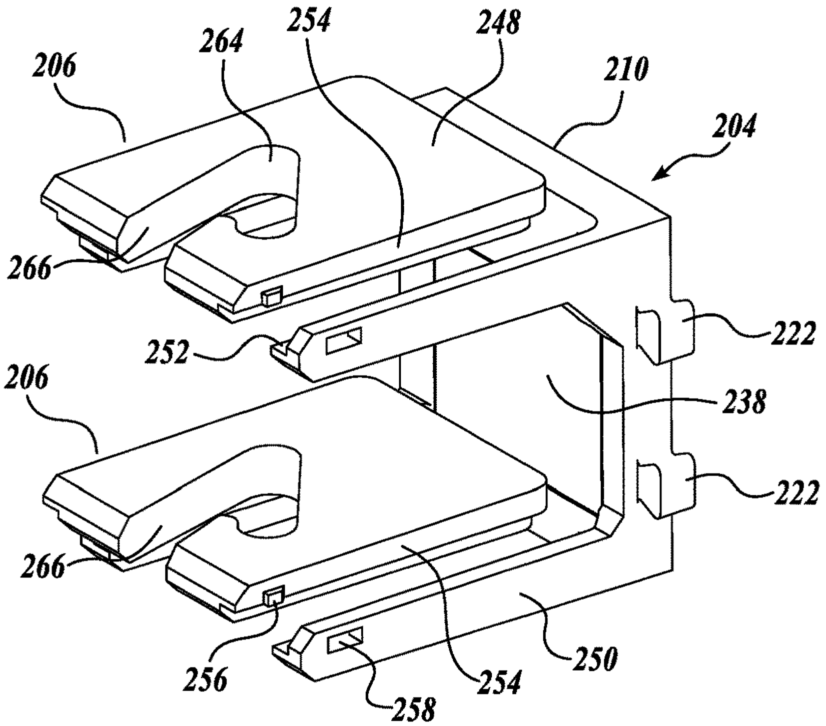
FIG. 8 is a partially exploded rear view of FIG. 7.
Figure 9:
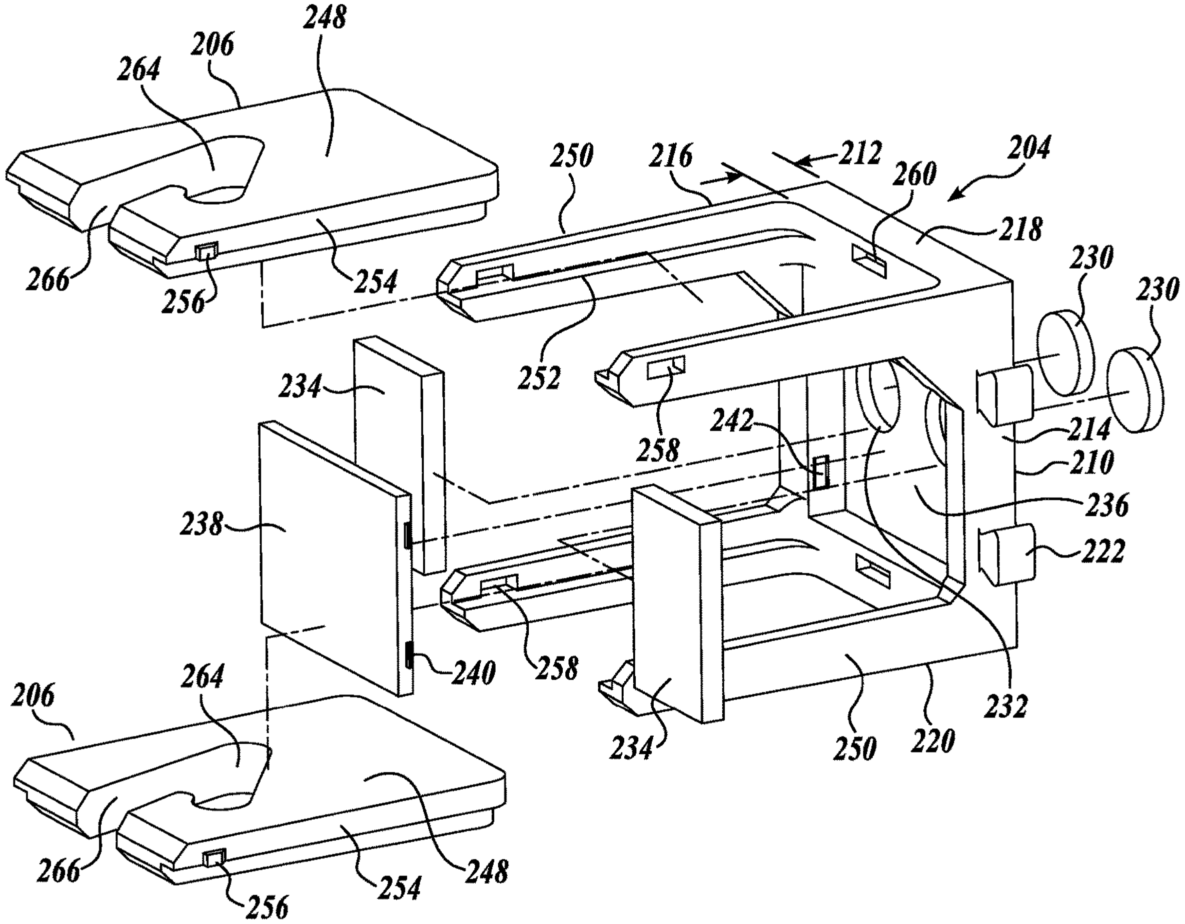
FIG. 9 is a front exploded view of FIG. 7.

Next describing the tool hanger system 200 in further detail, referring in particular to FIGS. 7-9, the magnetic base units 204 are generally planar in configuration to define a planar back wall 210 that serves as the interface between the holder unit and an upright/vertical mounting wall. The base unit has a thickness 212 that defines side edges 214 and 216 as well as top and bottom edges 218 and 220.

A pair of vertically spaced apart projections 222 extend laterally from the side edge 214 that are shaped and sized to lockingly engage within sockets 224 formed in the side edge 216 of an adjacent base unit 204. Although the projections 222 are shown as being in the shape of a pin and the sockets 224 are shown as being in the form of dovetails, the projections can take other shapes, for example, the shape of a tenon or a tongue. Correspondingly, the sockets can be in the shape of a mortice or groove.

Regardless of the specific shapes of the projections 222 and sockets 224, what is desirable is that the projections securely lockingly engage corresponding sockets. In this regard, the rather than using projections and sockets, other structures can be used connect the base units 204 or modular holder units 202 together in side-by-side relationship.

Also, although two vertically spaced apart projections 222 and sockets 224 are shown associated with a base unit 204, it is possible that a singular projection and socket be employed. It is also possible that more than two projections 222 and sockets 224 be employed.

As noted above, the base units 204 are designed to be magnetically attracted to a ferrometallic surface, whether a vertical or sloped wall or surface. In this regard, two disc-shaped magnets 230 are shown as engaged within close fitting through holes 232 formed in the base unit back wall 210 so that the rearward surface of the magnets 230 are substantially coplanar with the back wall.

Although the magnets 230 are shown as being of a disc shape, they can be of other shapes, such as square, rectangular, hexagonal, octagonal, etc. Also, although two magnets 230 are shown, a singular magnet could be used or more than two magnets could be employed.

A pair of metallic rectangular plates 234 are disposed in a close fitting shallow cavity 236 formed in the base unit 204. The plates 234 are secured in face-to-face relationship with the magnets 230 thereby to create a magnetic "sandwich." In this regard, the magnets 230 are sandwiched between the magnetic plates 234 and the metallic surface or wall on which the hanger system 200 is mounted. This assembly creates a magnetic field that can be may time stronger than the strength of the magnetic field created by the magnets 230 alone. Although two metallic plates 234 are illustrated, a singular plate could be used.

As shown in FIG. 9, a cover or retention plate 238 overlies the metallic plates 234 thereby to close off and seal the cavity 236. The cover 238 can be secured in place by numerous means, for example by the use of an adhesive or thermal welding. As another alternative, detents 240 can be provided to project a short distance from the side edges of the cover 130 to engage within close fitting blind holes 242 formed in the interior of the side edge portions 214 and 215 of the base unit 204. In this regard, the cover can be designed to snap in place into the cavity 236 to thereby formed a sealed construction.

Figures 10A, 10B, 10C, 10D, 10E, 10F:
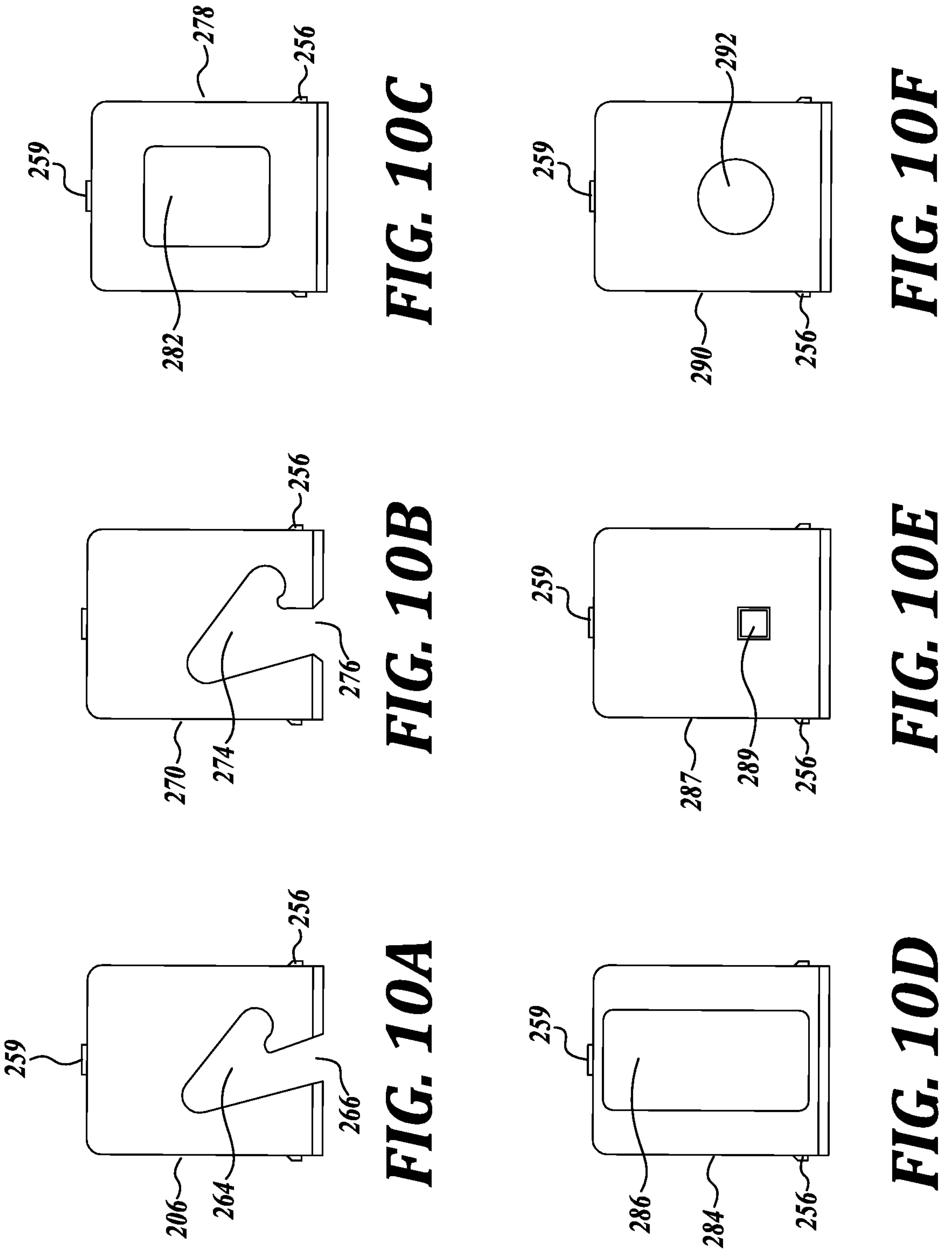
FIGS. 10A-10F are top plan views of the tool adaptor portions of the tool holder of FIG. 6A showing different configurations of the adaptor portion designed to hold different types of mechanic's tools.

FIGS. 7, 8, and 9 show two vertically spaced apart tool adaptors 206 that are configured to receive and hold a wrench, such as the open end wrench 250 shown in 6A-6C. A top view of this tool adaptor is shown in FIG. 10A. Other adaptors, discussed below, are shown in FIGS. 10B-10F. These other adaptors are of very similar construction to adaptor 206, with the exception of that the adaptors have openings, through holes or other features specific to the particular type and size of tool to be held or retained.

Each of the adaptors of FIGS. 10A-10F is generally in the form of a plate 248 that projects forwardly in spaced parallel relationship from the upper and lower portions of a base unit 204. The adaptor 206 is supported by laterally spaced apart arms 250 that project forwardly from the base unit back wall 210 at the elevation of the top edge 218 as well as the elevation of the bottom edge 220 of the back wall. The arms 250 are formed with an interior support ledge 252 extending along the lengths of the interior sides of arms 250. The ledge 252 supports the underside of an overhang 254 extending along the sides of the adaptor 206.

The adaptor 206 is locked into engagement with the arms 250 by detents 256 that extend outwardly from the overhangs 254 to engage into close fitting holes 258 formed in the outer location of the arms 250. As can be appreciated, the arms 250 are capable of flexing outwardly to enable the adaptor detents to slide along the arms until reaching the receiving holes 258, whereupon the arms can resume their nominal parallel configuration.

Also, optionally a detent 259 projects rearwardly from the adaptor 206 to engage into a close filling hole 260 formed in the back wall 210 of the base unit 204. This construction adds to the structural rigidity of the holder unit 202.

As noted above, the adaptor 206 is configured to receive and support a mechanic's wrench 244. See FIGS. 6A, 6B, 7, 8, 9, and 10A. In this regard, a diagonal slot 264 is formed through the adaptor plate 248. A lead in slot 266 is provided to conveniently place the wrench 244 into and out of engagement with the diagonal slot 264.

The tool adaptor 270 shown in FIG. 10B is similar to the tool adaptor 206, but configured to hold a large size wrench 272. In this regard, the adaptor 270 is configured with a diagonal slot 274 and a lead in slot 276.

The tool adaptor 278 shown in FIG. 10C is configured to receive one handle of a pair of pliers 280. In this regard, a rectangular through hole 282 is formed in the adaptor 278.

The tool adaptor 284 shown in FIG. 10D is configured to receive a larger pair of pliers 285. As such, the through hole 286 formed in the adaptor 284 is larger than the through hole 282.

The adaptor 287 shown in FIGS. 6A-6D and 10E is configured to hold a socket 288. In this regard, a square shank 289 extends upwardly from the top surface of the adaptor 287 to engage the drive hole at the end of the socket. As shown in FIGS. 1A-1D, to provide clearance for socket 288, an upper adapter is not used; rather the square shank 289 is mounted on a single lower adapter 287.

The adaptor 290 shown in FIG. 10F is configured to hold a screwdriver 291. In this regard, a circular hole 292 extends through the adaptor 290 to receive the shank of the screwdriver 291 downwardly therein.

FIGS. 10A-10C show adaptors configured to hold additional tools including wrenches 293, 294, and 295, and smaller screwdriver 296 sockets 297 and 298. Of course, the adaptors can be configured to hold numerous other types of mechanic's tools, such as punches, snippers, rachet wrenches, crescent wrenches, hammers, mallets, etc. Further, as with socket 288, for sockets 297 and 298 a single lower adapter is used so as to provide clearance for the sockets.

While illustrative embodiments have been illustrated and described, it will be appreciated that various changes can be made therein without departing from the spirit and scope of the invention. In this regard, although the description above has focused on mechanic's tools, the modular hanger system of the present disclosure used with other items besides mechanic's tool, for example, kitchen or cooking utensils, butcher's tools, carpenter's tools and medical or dental instruments.

In addition, in lieu of using two adapters 106/206 per holder unit 102/202, the tow adapters can be configured into a single adapter that may or may not extend the full height of a corresponding base unit 104/204. Such single adapter could be attached to the base unit 104/204 in a manner that is substantially the same or similar as described above or may be attached to the base unit 104/204 in a different manner.

The embodiments of the invention in which an exclusive property or privilege is claimed are defined as follows:

1. A tool hanger system composed of modular, connectable holder units to receive and hold a desired number and types of mechanic's tools on an upright surface, the holder units comprising:

a magnetic base unit having a front side, a back side that is attachable to an upright ferromagnetic surface, and opposite first and second side edges, at least one projection unitarily constructed with the first side edge and extending from the first side edge and at least one socket extending into the second side edge to receive the at least one projection of an adjacent magnetic base unit to interlock the base units in side-by-side relationship; and a selected tool adaptor engageable with the base unit to cantilever from the front side of the base unit, the adaptor configured to receive and hold a mechanic's tool.

2. A modular tool hanger system according to claim 1, wherein the at least one projection comprises a tenon unitarily constructed with the first side edge and the at least one socket comprising a mortice.

3. A modular tool hanger system according to claim 1, wherein the at least one projection comprises a pin unitarily constructed with the first side edge and the at least one socket comprising a dovetail.

4. A modular tool hanger system according to claim 1, wherein the at least one projection comprises a tongue unitarily constructed with the first side edge and the at least one socket comprising a groove.

5. A modular tool hanger system according to claim 1, wherein the holder units comprising at least one metallic plate positioned in the base unit between the front side and the backside of the base unit, and at least one magnet contacting the metallic plate toward the backside of the base unit, whereby the metallic plate enhancing the magnetic attraction of the base unit to the upright ferromagnetic surface.

6. The modular tool hanger according to claim 5, wherein the at least one metallic plate is substantially planar in form.

7. The modular tool hanger according to claim 6, wherein the area of the metallic plate is larger than the area of the at least one magnet.

8. The modular tool hanger according to claim 5, further comprising a retainer to surround the at least one magnet to assist in retaining the at least one magnet in stationary position.

9. The modular tool hanger according to claim 5, wherein the base unit comprising a back wall coinciding with the back side of the base unit, and the at least one magnet extending through the back wall.

10. The modular tool hanger according to claim 1, wherein the tool adapter defining an opening extending therethrough configured for receiving a specific mechanic's tool therethrough in upright orientation.

11. The modular tool hanger according to claim 1, wherein the tool adapter comprising at least one male projection extending therefrom for engaging in locking relationship with the base unit.

12. The modular tool hanger according to claim 11, wherein the base unit comprising portions defining a socket for receiving the at least one male projection in locking relationship to receive and hold a specific type of mechanic's tool.

13. The modular tool hanger according to claim 1, wherein the tool adaptor comprising an upper unit and a lower unit, both engageable with the base unit to cantilever from the front side of the base unit in spaced vertical relationship to receive and hold a mechanic's tool that spans between the upper and lower units.

14. The modular tool hanger according to claim 13, wherein the upper and lower units each comprising at least one male projection extending therefrom for engaging in locking relationship with the base unit.

15. The modular tool hanger according to claim 14, wherein the base unit comprising portions defining sockets for receiving the at least one male projection in locking relationship with the upper and lower tool adapter units.

16. The modular tool hanger according to claim 13, wherein the base unit having portions defining support ledges configured to underlie and support the portions of the tool adaptors adjacent the base unit.

17. The modular tool hanger according to claim 1, wherein the base unit having portions defining a support ledge configured to underlie and support the portion of the tool adaptor adjacent the base unit.

* * * * *